(12) United States Patent
Smith et al.

(10) Patent No.: US 8,473,585 B1
(45) Date of Patent: Jun. 25, 2013

(54) MULTI-THREADED OPTIMIZATION FOR DATA UPLOAD

(75) Inventors: Joshua Earl Smith, Raleigh, NC (US); Robert Griffin Mills, Morrisville, NC (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 13/533,507

(22) Filed: Jun. 26, 2012

(51) Int. Cl.
*G06F 15/16* (2006.01)
(52) U.S. Cl.
USPC .......................... 709/219; 709/218; 709/230
(58) Field of Classification Search
USPC ........................................ 709/218, 219, 230
See application file for complete search history.

(56) References Cited

U.S. PATENT DOCUMENTS 7,155,578 B2 * 12/2006 Hashem et al. ............... 711/147
8,214,707 B2 * 7/2012 Munson et al. ............... 714/748

\* cited by examiner

*Primary Examiner* — Adnan Mirza
(74) *Attorney, Agent, or Firm* — Choate Hall & Stewart LLP

(57) ABSTRACT

A method may include receiving, at a first computing device, a command, from a second computing device, to upload a file to a storage region; negotiating, with a third computing device, a destination for the file, where the destination correlates to a storage location at the storage region; monitoring upload of at least a first chunk of the file and a second chunk of the file to the destination, where the first chunk is logically contiguous with the second chunk; determining that a threshold portion of the second chunk has been uploaded prior to upload of an entirety of the first chunk; initiating suspension of upload of the second chunk; determining upload of the entirety of the first chunk has completed; initiating continuation of upload of the second chunk; and reporting success of upload of the first chunk to the second computing device.

20 Claims, 9 Drawing Sheets

MULTI-THREADED OPTIMIZATION FOR DATA UPLOAD

BACKGROUND

Data may be stored in a network environment, for example to provide access to a number of users in diverse locations or to provide flexible storage bandwidth for individuals and entities. For example, an individual or entity may enter into a service agreement with a network (e.g., "Cloud") based storage solution. Rather than purchasing and managing storage hardware, for example, the individual or entity may utilize storage bandwidth on an as-needed basis by uploading data to a Cloud storage environment.

SUMMARY

In one aspect, the present disclosure describes a method that may include receiving, at a first computing device, a command, from a second computing device, to upload a file to a storage region. The method may include negotiating, with a third computing device, a destination for the file, where the destination correlates to a storage location at the storage region. The method may include monitoring, by a processor of the first computing device, upload of at least a first chunk of the file and a second chunk of the file to the destination, where the first chunk is logically contiguous with the second chunk. The method may include determining, by the processor, that a threshold portion of the second chunk has been uploaded prior to upload of an entirety of the first chunk. The method may include, responsive to determining that the threshold portion of the second chunk has been uploaded, initiating suspension of upload of the second chunk. The method may include determining upload of the entirety of the first chunk has completed. The method may include, responsive to determining upload of the entirety of the first chunk has completed, initiating continuation of upload of the second chunk. The method may include reporting success of upload of the first chunk to the second computing device.

The method may further include, responsive to determining upload of the entirety of the first chunk has completed, initiating upload of a third chunk of the file. The third chunk may be logically contiguous with the second chunk.

Initiating upload of the third chunk may include issuing an upload command to the second computing device. The threshold portion may include a threshold number of bytes of data.

The method may further include monitoring, by the processor of the first computing device, upload of a third chunk of the file and a fourth chunk of the file. The third chunk may be logically contiguous with the second chunk. The fourth chunk may be logically contiguous with the third chunk. The third chunk and the fourth chunk may be uploaded simultaneously with the first chunk and the second chunk.

The method may further include determining, by the processor, that a threshold portion of the third chunk has been uploaded prior to upload of the entirety of the first chunk. The method may further include, responsive to determining that a threshold portion of the third chunk has been uploaded prior to upload of the entirety of the first chunk, initiating suspension of upload of the third chunk. The method may further include determining upload of the entirety of the second chunk has completed. The method may further include, responsive to determining both upload of the entirety of the first chunk has completed and upload of an entirety of the second chunk has completed, initiating continuation of upload of the third chunk.

The threshold portion of the third chunk may be equal to the threshold portion of the second chunk. The method may further include determining, at the processor, a failure of upload of the first chunk. The method may further include, responsive to determining the failure of upload of the first chunk, initiating suspension of upload of the second chunk, and initiating re-upload of the first chunk.

In one aspect, the present disclosure describes a system that may include a processor and memory storing instructions thereon, where the instructions when executed may cause the processor to receive, at a first computing device, a command, from a second computing device, to upload a file to a storage region. The instructions when executed may further cause the processor to negotiate, with a third computing device, a destination for the file, where the destination correlates to a storage location at the storage region. The instructions when executed may further cause the processor to monitor upload of at least a first chunk of the file and a second chunk of the file to the destination, where the first chunk is logically contiguous with the second chunk. The instructions when executed may further cause the processor to determine that a threshold portion of the second chunk has been uploaded prior to upload of an entirety of the first chunk. The instructions when executed may further cause the processor to, responsive to determining that the threshold portion of the second chunk has been uploaded, initiate suspension of upload of the second chunk. The instructions when executed may further cause the processor to determine upload of the entirety of the first chunk has completed. The instructions when executed may further cause the processor to, responsive to determining upload of the entirety of the first chunk has completed, initiate continuation of upload of the second chunk. The instructions when executed may further cause the processor to report success of upload of the first chunk to the second computing device.

In one aspect, the present disclosure describes a non-transient computer readable medium having instructions stored thereon that, when executed, may cause a processor to receive, at a first computing device, a command, from a second computing device, to upload a file to a storage region. The instructions when executed may further cause the processor to negotiate, with a third computing device, a destination for the file, where the destination correlates to a storage location at the storage region. The instructions when executed may further cause the processor to monitor upload of at least a first chunk of the file and a second chunk of the file to the destination, where the first chunk is logically contiguous with the second chunk. The instructions when executed may further cause the processor to determine that a threshold portion of the second chunk has been uploaded prior to upload of an entirety of the first chunk. The instructions when executed may further cause the processor to, responsive to determining that the threshold portion of the second chunk has been uploaded, initiate suspension of upload of the second chunk. The instructions when executed may further cause the processor to determine upload of the entirety of the first chunk has completed. The instructions when executed may further cause the processor to, responsive to determining upload of the entirety of the first chunk has completed, initiate continuation of upload of the second chunk. The instructions when executed may further cause the processor to report success of upload of the first chunk to the second computing device.

In one aspect, the present disclosure describes a method that may include receiving, at a first computing device, a command, from a second computing device, to upload a file to a storage region. The method may include negotiating, with a third computing device, a destination for the file, where the destination correlates to a storage location at the storage region. The method may include monitoring, by a processor of the first computing device, upload of at least a first chunk of the file and a second chunk of the file to the destination. The method may include determining, by the processor, that a threshold portion of the second chunk has been uploaded prior to upload of an entirety of the first chunk. The method may include, after determining, initiating, by the processor, suspension of upload of the second chunk. The method may include determining, by the processor, upload of the entirety of the first chunk has completed. The method may include, after determining upload of the entirety of the first chunk has completed, initiating, by the processor, continuation of upload of the second chunk. The method may include reporting success of upload of the first chunk to the second computing device.

In one aspect, the present disclosure describes a system including a processor and a memory storing instructions thereon, where the instructions when executed may cause the processor to receive, at a first computing device, a command, from a second computing device, to upload a file to a storage region. The instructions may further cause the processor to negotiate, with a third computing device, a destination for the file, where the destination correlates to a storage location at the storage region. The instructions may further cause the processor to monitor upload of at least a first chunk of the file and a second chunk of the file to the destination. The instructions may further cause the processor to determine that a threshold portion of the second chunk has been uploaded prior to upload of an entirety of the first chunk. The instructions may further cause the processor to, after determining that the threshold portion of the second chunk has been uploaded, initiate suspension of upload of the second chunk. The instructions may further cause the processor to determine upload of the entirety of the first chunk has completed. The instructions may further cause the processor to, after determining upload of the entirety of the first chunk has completed, initiate continuation of upload of the second chunk. The instructions may further cause the processor to report success of upload of the first chunk to the second computing device.

The system may receive the command from the second computing device through a virtual machine application interface. The first computing device may be in communication with a number of networked storage devices. The system may include a Web server configured to communicate with the second computing device through a browser-based file sharing service. The file may be uploaded using Hypertext Transfer Protocol Secure.

The instructions when executed may further cause the processor to, responsive to completion of upload of the file, create a data base entry regarding the file, where the data base entry may include an address for accessing the file through the first computing device.

In one aspect, the present disclosure describes a non-transient computer readable medium having instructions stored thereon that, when executed, may cause a processor to receive, at a first computing device, a command, from a second computing device, to upload a file to a storage region. The instructions may further cause the processor to negotiate, with a third computing device, a destination for the file, where the destination correlates to a storage location at the storage region. The instructions may further cause the processor to monitor upload of at least a first chunk of the file and a second chunk of the file to the destination. The instructions may further cause the processor to determine that a threshold portion of the second chunk has been uploaded prior to upload of an entirety of the first chunk. The instructions may further cause the processor to, after determining that the threshold portion of the second chunk has been uploaded, initiate suspension of upload of the second chunk. The instructions may further cause the processor to determine upload of the entirety of the first chunk has completed. The instructions may further cause the processor to, after determining upload of the entirety of the first chunk has completed, initiate continuation of upload of the second chunk. The instructions may further cause the processor to report success of upload of the first chunk to the second computing device.

In one aspect, the present disclosure describes a method that may include receiving, at a first computing device, a request, from a second computing device, to upload a file. The method may further include monitoring, by a processor of the first computing device, upload of at least a first chunk of the file and a second chunk of the file to a third computing device, where the first chunk is logically contiguous with the second chunk. The method may further include determining, by the processor, that a threshold portion of the second chunk has been uploaded prior to upload of an entirety of the first chunk. The method may further include, responsive to determining that a threshold portion of the second chunk has been uploaded prior to upload of an entirety of the first chunk, initiating, by the processor, suspension of upload of the second chunk. The method may further include determining, by the processor, receipt of the entirety of the first chunk. The method may further include, responsive to determining receipt of the entirety of the first chunk, continuing, by the processor, upload of the second chunk. The method may further include initiating, by the processor, upload of a third chunk of the file, where the third chunk is logically contiguous with the second chunk.

In one aspect, the present disclosure describes a system including a processor and a memory storing instructions thereon, where the instructions when executed may cause the processor to receive, at a first computing device, a request, from a second computing device, to upload a file. The instructions when executed may further cause the processor to monitor upload of at least a first chunk of the file and a second chunk of the file to a third computing device, where the first chunk is logically contiguous with the second chunk. The instructions when executed may further cause the processor to determine that a threshold portion of the second chunk has been uploaded prior to upload of an entirety of the first chunk. The instructions when executed may further cause the processor to, responsive to determining that a threshold portion of the second chunk has been uploaded prior to upload of an entirety of the first chunk, initiate suspension of upload of the second chunk. The instructions when executed may further cause the processor to determine receipt of the entirety of the first chunk. The instructions when executed may further cause the processor to, responsive to determining receipt of the entirety of the first chunk, continue upload of the second chunk, and initiate upload of a third chunk of the file. The third chunk may be logically contiguous with the second chunk.

In one aspect, the present disclosure describes a non-transient computer readable medium having instructions stored thereon that, when executed, may cause a processor to receive, at a first computing device, a request, from a second computing device, to upload a file. The instructions when executed may further cause the processor to monitor upload of at least a first chunk of the file and a second chunk of the file to a third computing device, where the first chunk is logically contiguous with the second chunk. The instructions when executed may further cause the processor to determine that a threshold portion of the second chunk has been uploaded prior to upload of an entirety of the first chunk. The instructions when executed may further cause the processor to, responsive to determining that a threshold portion of the second chunk has been uploaded prior to upload of an entirety of the first chunk, initiate suspension of upload of the second chunk. The instructions when executed may further cause the processor to determine receipt of the entirety of the first chunk. The instructions when executed may further cause the processor to, responsive to determining receipt of the entirety of the first chunk, continue upload of the second chunk, and initiate upload of a third chunk of the file. The third chunk may be logically contiguous with the second chunk.

The third computing device may include a storage server in communication with a number of networked storage devices. The instructions, when executed, may further cause the processor to negotiate, with the storage server, a destination for the file, where the destination correlates to a storage location on at least one of the number of networked storage devices.

The first chunk may be logically contiguous with the second chunk. The instructions, when executed, may further cause the processor to, responsive to determining receipt of the entirety of the first chunk, report success of upload of the first chunk to the second computing device. The instructions, when executed, may further cause the processor to, responsive to completion of upload of an entirety of the file, store an address, where the address provides access to the file.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1A:
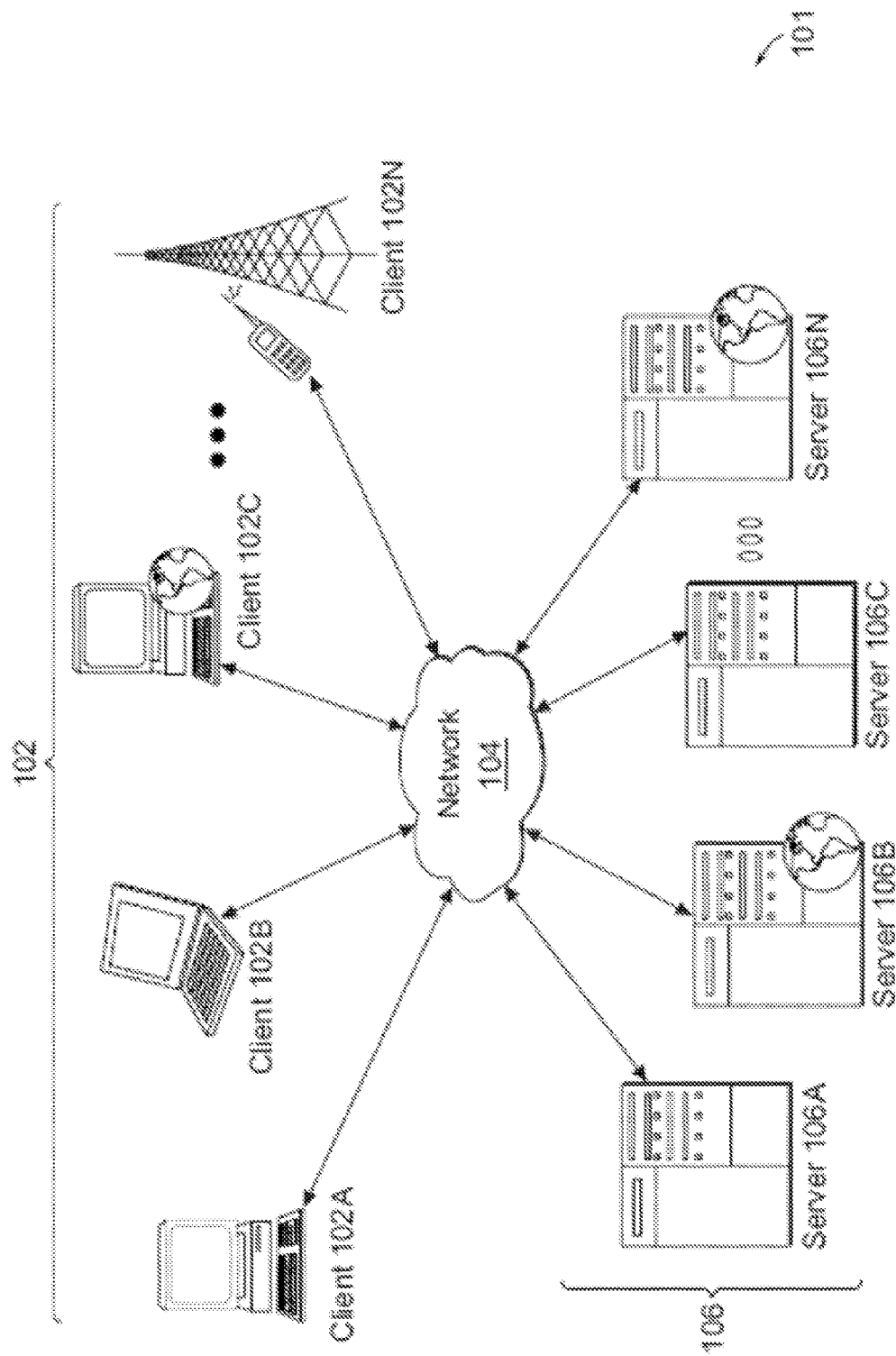
FIG. 1 depicts embodiments of network environments that provide remote access to computing devices that may execute application programs.
FIG. 1B and FIG. 1C are block diagrams that depict embodiments of computing devices.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

FIG. 1A illustrates one embodiment of a computing environment 101 that includes one or more client machines 102a-102n (generally referred to herein as "client machine(s) 102") that are in communication with one or more servers 106a-106n (generally referred to herein as "server(s) 106"). Installed in between the client machine(s) 102 and server(s) 106 is a network 104.

In one embodiment, the computing environment 101 may include an appliance installed between the server(s) 106 and client machine(s) 102. This appliance may manage client/server connections, and in some cases may load balance client connections amongst a plurality of backend servers.

The client machine(s) 102 may in some embodiments be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 may be a virtual machine 102c. The virtual machine 102c may be any virtual machine, while in some embodiments the virtual machine 102c may be any virtual machine managed by a hypervisor developed by XenSolutions, Citrix Systems, IBM, VMware, or any other hypervisor. In other embodiments, the virtual machine 102c may be managed by any hypervisor, while in still other embodiments, the virtual machine 102c may be managed by a hypervisor executing on a server 106 or a hypervisor executing on a client 102.

The client machine 102 may in some embodiments execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 may display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol may be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment may include more than one server 106a-106n such that the servers 106a-106n are logically grouped together into a server farm 106. The server farm 106 may include servers 106 that are geographically dispersed and logically grouped together in a server farm 106, or servers 106 that are located proximate to each other and logically grouped together in a server farm 106. Geographically dispersed servers 106a-106n within a server farm 106 can, in some embodiments, communicate using a wide area network (WAN), metropolitan area network (MAN), or local area network (LAN), where different geographic regions may be characterized as: different continents; different regions of a continent; different countries; different states; different cities; different campuses; different rooms; or any combination of the preceding geographical locations. In some embodiments, the server farm 106 may be administered as a single entity, while in other embodiments the server farm 106 may include multiple server farms 106.

In some embodiments, a server farm 106 may include servers 106 that execute a substantially similar type of operating system platform (e.g., WINDOWS NT®, manufactured by Microsoft Corp. of Redmond, Wash., UNIX™, LINUX™, or Mac OS XSnow Leopard by Apple Inc. of Cupertino, Calif.). In other embodiments, the server farm 106 may include a first group of servers 106 that execute a first type of operating system platform, and a second group of servers 106 that execute a second type of operating system platform. The server farm 106, in other embodiments, may include servers 106 that execute different types of operating system platforms.

The server 106, in some embodiments, may be any server type. In other embodiments, the server 106 may be any of the following server types: a file server; an application server; a web server; a proxy server; an appliance; a network appliance; a gateway; an application gateway; a gateway server; a virtualization server; a deployment server; a secure socket layer (SSL) virtual private network (VPN) server; a firewall; a web server; an application server or as a master application server; a server 106 executing an active directory; or a server 106 executing an application acceleration program that provides firewall functionality, application functionality, or load balancing functionality. In some embodiments, a server 106 may be a Remote Authentication Dial In User Service (RADIUS) server that includes a remote authentication dial-in user service. In embodiments where the server 106 comprises an appliance, the server 106 may be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106a that receives requests from a client machine 102, forwards the request to a second server 106b, and responds to the request generated by the client machine 102 with a response from the second server 106b. The first server 106a may acquire an enumeration of applications available to the client machine 102 as well as address information associated with an application server 106 hosting an application identified within the enumeration of applications. The first server 106a may then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an Independent Computing Architecture (ICA) client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node may identify and provide address information associated with a server 106 hosting a requested application, to one or more clients 102 or servers 106. In still other embodiments, the master node may be a server farm 106, a client 102, a cluster of client nodes 102, or an appliance.

One or more clients 102 and/or one or more servers 106 may transmit data over a network 104 installed between machines and appliances within the computing environment 101. The network 104 may comprise one or more sub-networks, and may be installed between any combination of the clients 102, servers 106, computing machines and appliances included within the computing environment 101. In some embodiments, the network 104 may be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that may be any of the following network types: a point to point network; a broadcast network; a telecommunications network; a data communication network; a computer network; an Asynchronous Transfer Mode (ATM) network; a Synchronous Optical Network (SONET) network; a Synchronous Digital Hierarchy (SDH) network; a wireless network; a wireline network; or a network 104 that includes a wireless link where the wireless link may be an infrared channel or satellite band. The network topology of the network 104 may differ within different embodiments. Possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol may be any one of the following: Asynchronous Messaging Protocol (AMPS); Time Division Multiple Access (TDMA); Code Division Multiple Access (CDMA); Global System for Mobile Communications (GSM); general packet radio service (GPRS); Universal Mobile Telecommunications System (UMTS); or any other protocol able to transmit data among mobile devices.

Figure 1B:
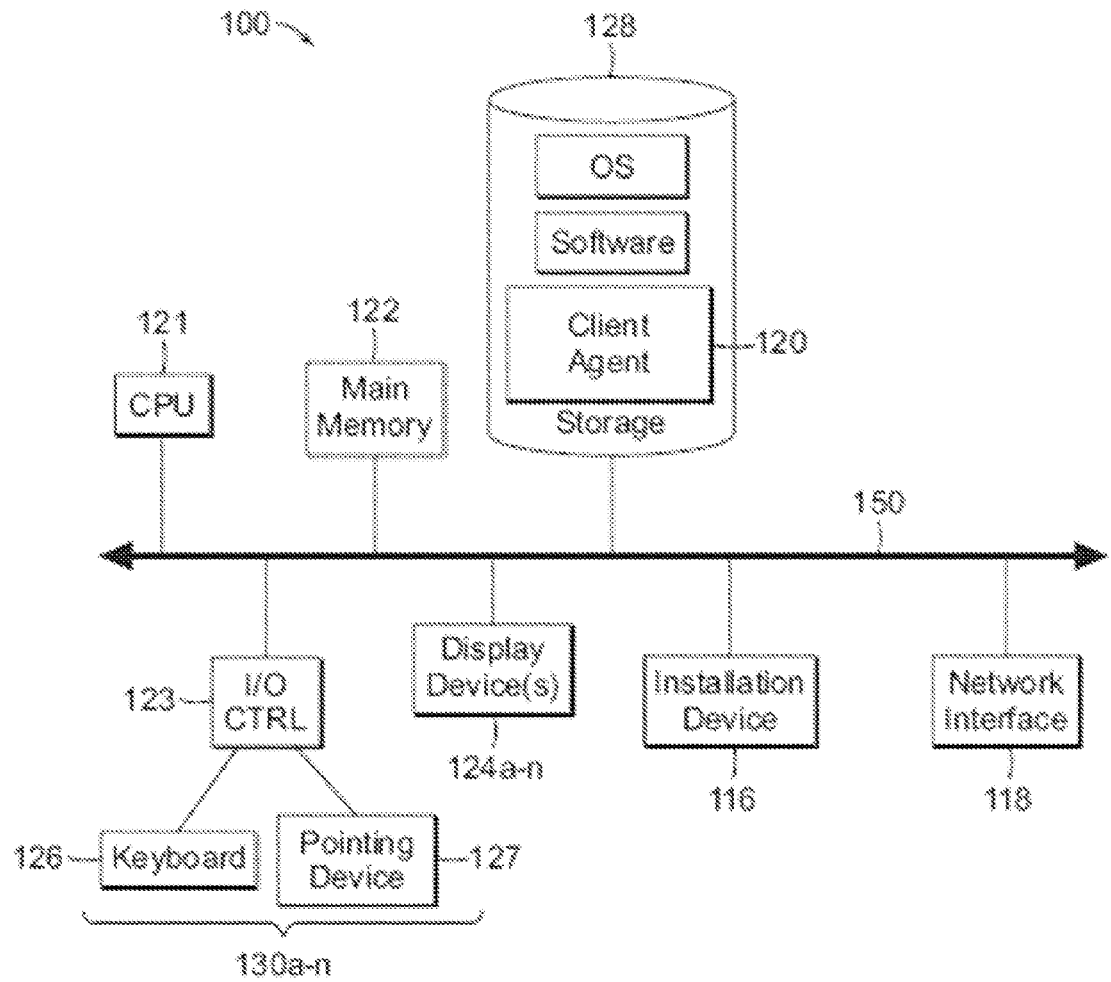

Illustrated in FIG. 1B is an embodiment of a computing device 100, where the client machine 102 and server 106 illustrated in FIG. 1A may be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124a-124n; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130a-130n.

Figure 1C:
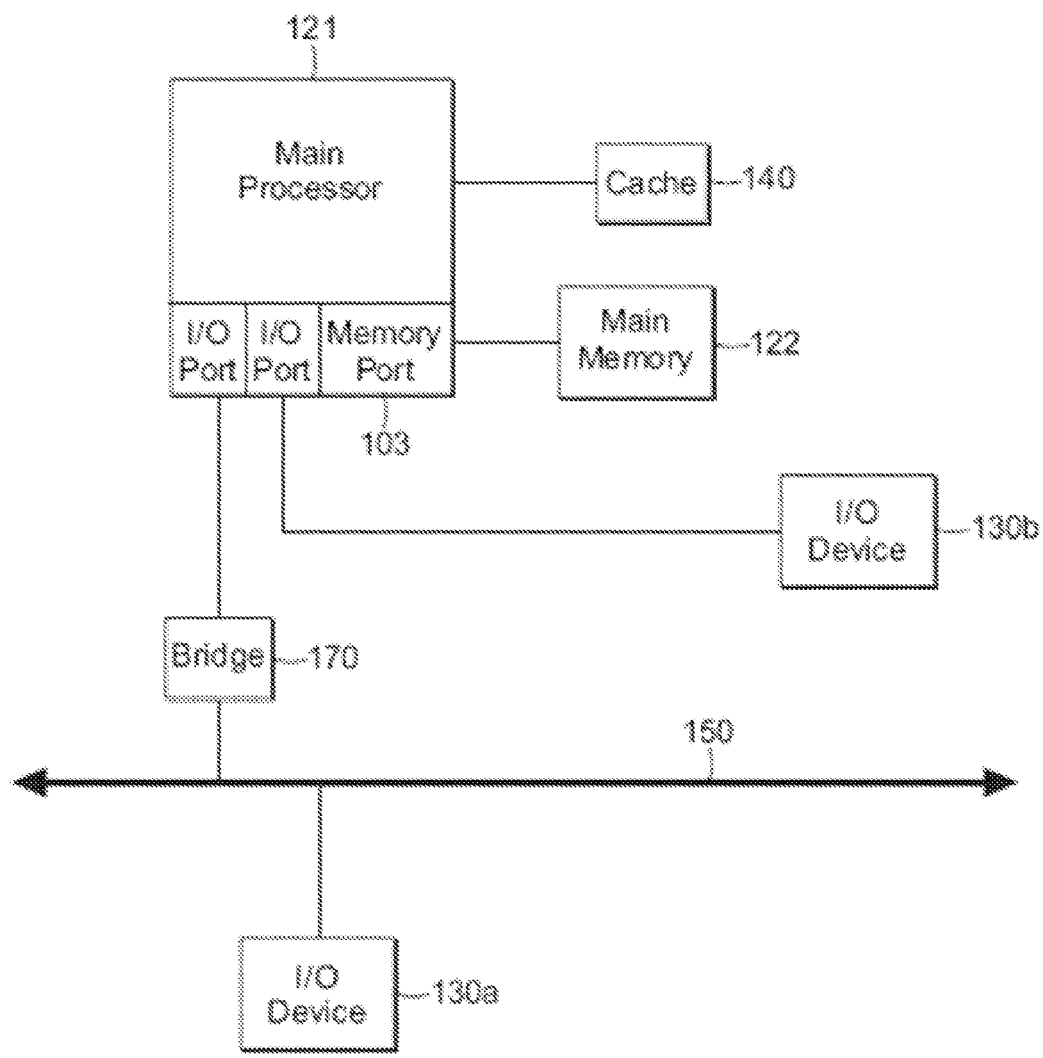

FIG. 1C illustrates one embodiment of a computing device 100, where the client machine 102 and server 106 illustrated in FIG. 1A may be deployed as and/or executed on any embodiment of the computing device 100 illustrated and described herein. Included within the computing device 100 is a system bus 150 that communicates with the following components: a bridge 170, and a first I/O device 130a. In another embodiment, the bridge 170 is in further communication with the main central processing unit 121, where the central processing unit 121 may further communicate with a second I/O device 130b, a main memory 122, and a cache memory 140. Included within the central processing unit 121, are I/O ports, a memory port 103, and a main processor.

Embodiments of the computing machine 100 may include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 may include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 may include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 may be segmented and assigned to a particular core within the processing unit 121. In one embodiment, the one or more processing cores or processors in the computing device 100 may each access local memory. In still another embodiment, memory within the computing device 100 may be shared amongst one or more processors or processing cores, while other memory may be accessed by particular processors or subsets of processors. In embodiments where the computing device 100 includes more than one processing unit, the multiple processing units may be included in a single integrated circuit (IC). These multiple processors, in some embodiments, may be linked together by an internal high speed bus, which may be referred to as an element interconnect bus.

In embodiments where the computing device 100 includes one or more processing units 121, or a processing unit 121 including one or more processing cores, the processors may execute a single instruction simultaneously on multiple pieces of data (SIMD), or in other embodiments may execute multiple instructions simultaneously on multiple pieces of data (MIMD). In some embodiments, the computing device 100 may include any number of SIMD and MIMD processors.

The computing device 100, in some embodiments, may include a graphics processor or a graphics processing unit (Not Shown). The graphics processing unit may include any combination of software and hardware, and may further input graphics data and graphics instructions, render a graphic from the inputted data and instructions, and output the rendered graphic. In some embodiments, the graphics processing unit may be included within the processing unit 121. In other embodiments, the computing device 100 may include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130a-130n. In some embodiments, the local system bus 150 may be any one of the following types of buses: a Video Electronics Standards Association (VESA) VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130a-130n that is a video display 124 that communicates with the central processing unit 121. Still other versions of the computing machine 100 include a processor 121 connected to an I/O device 130a-130n via any one of the following connections: HyperTransport, Rapid I/O, or InfiniBand. Further embodiments of the computing machine 100 include a processor 121 that communicates with one I/O device 130a using a local interconnect bus and a second I/O device 130b using a direct connection.

The computing device 100, in some embodiments, includes a main memory unit 122 and cache memory 140. The cache memory 140 may be any memory type, and in some embodiments may be any one of the following types of memory: SRAM; BSRAM; or EDRAM. Other embodiments include cache memory 140 and a main memory unit 122 that may be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that may access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications may in some embodiments include a client agent 120, or any portion of a client agent 120. The computing device 100 may further include a storage device 128 that may be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections may also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 may comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130a-130n: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103a-130n to control the one or more I/O devices. Some embodiments of the I/O devices 130a-130n may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 may connect to multiple display devices 124a-124n, in other embodiments the computing device 100 may connect to a single display device 124, while in still other embodiments the computing device 100 connects to display devices 124a-124n that are the same type or form of display, or to display devices that are different types or forms. Embodiments of the display devices 124a-124n may be supported and enabled by the following: one or multiple I/O devices 130a-130n; the I/O controller 123; a combination of I/O device(s) 130a-130n and the I/O controller 123; any combination of hardware and software able to support a display device 124a-124n; any type and/or form of video adapter, video card, driver, and/or library to interface, communicate, connect or otherwise use the display devices 124a-124n. The computing device 100 may in some embodiments be configured to use one or multiple display devices 124a-124n, these configurations include: having multiple connectors to interface to multiple display devices 124a-124n; having multiple video adapters, with each video adapter connected to one or more of the display devices 124a-124n; having an operating system configured to support multiple displays 124a-124n; using circuits and software included within the computing device 100 to connect to and use multiple display devices 124a-124n; and executing software on the main computing device 100 and multiple secondary computing devices to enable the main computing device 100 to use a secondary computing device's display as a display device 124a-124n for the main computing device 100. Still other embodiments of the computing device 100 may include multiple display devices 124a-124n provided by multiple secondary computing devices and connected to the main computing device 100 via a network.

In some embodiments, the computing machine 100 may execute any operating system, while in other embodiments the computing machine 100 may execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 may execute multiple operating systems. For example, the computing machine 100 may execute PARALLELS or another virtualization platform that may execute or manage a virtual machine executing a first operating system, while the computing machine 100 executes a second operating system different from the first operating system.

The computing machine 100 may be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 may be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 may be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 2:
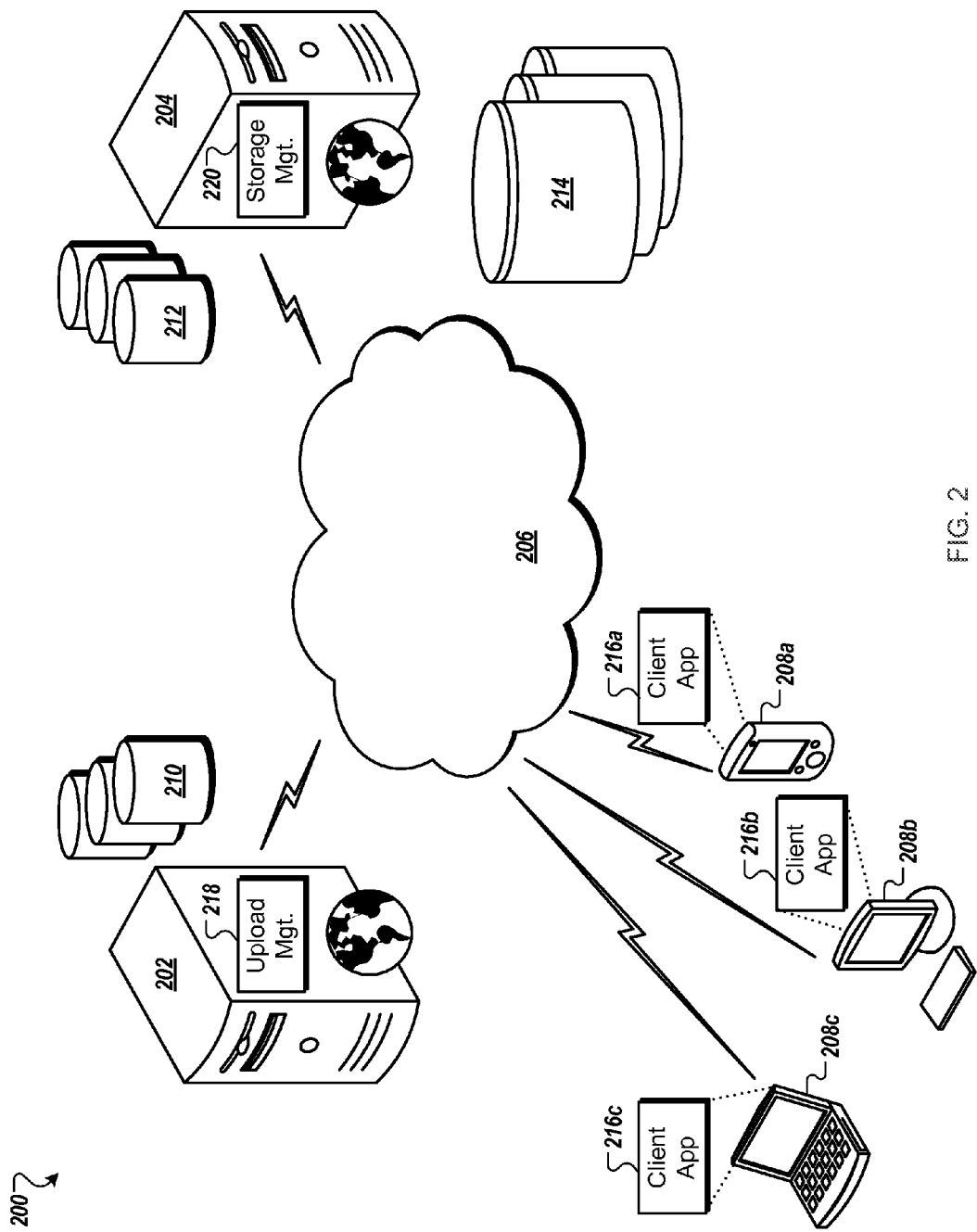
FIG. 2 is a system diagram of an example system for multi-threaded optimization for data upload.

Turning to FIG. 2, in some implementations, a system 200 for multi-threaded optimization during data upload may include a web server 202 in communication with a storage server 204, for example through a network 206. Although illustrated as single servers 202, 204, in some implementations, the web server 202 and/or the storage server 204 may be implemented using a number of servers, such as a server farm or distributed server network. The storage server 204, for example, may be included within a Cloud storage system.

In some implementations, a client computing device 208, such as, in some examples, a mobile computing device 208a, a desktop computing device 208b, or a laptop computing device 208c, may connect to the web server 202 to upload a file to the storage server 204. In some implementations, the web server 202 may provide a browser-based tool to the client computing devices 208 for use in uploading a file to the storage server 204. In some implementations, an upload software tool may be installed and executing on one or more of the client computing devices 208. For example, the upload software tool may be designed to communicate with an upload management application 218 executing upon the web server 218 to manage the upload of data to the storage server 204.

In some implementations, a client application 216 executing upon a respective client computing device 208 may coordinate with the upload management application 218 to upload a file to the storage server 204. In some implementations, the client application 216 may be a runtime executable application downloaded by one of the client devices 208, for example from the web server 202. In a particular example, the client application 216a may be a Java-based data upload management tool designed to run within a Web browser of the mobile computing device 208a. In some implementations, the client applications 216 may be installed software applications designed to function within the respective operating system of each client computing device 208. For example, a particular client application 216 designed for installation and execution upon a particular client device 208 may be developed to function through a workplace productivity software application such as, in some examples, a word processing application, electronic mail application, or file management application. Further to the example, a widget or menu option within the workplace productivity software application may be selected to launch an interface between the particular client application 216 and the upload management application 218.

The client applications 216, in some implementations, may communicate file transfer request information to the upload management application 218. For example, a client application 216c executing upon the laptop computing device 208c may communicate file transfer request information to the upload management application 218. The file transfer request information may include data file information such as, in some examples, a file name, file type, file size, and file permissions. Additionally, in some implementations, the file transfer request information may include authorization information, for example authenticating the user requesting upload of the file. For example, the client application 216c may provide a user name, password, and/or other authentication token to the upload management application 218.

A portion of the information provided by the client application 216, in some implementations, may be stored by the upload management application 218. For example, the upload management application 218 may store information regarding the file being uploaded in a metadata store 210. The metadata store 210, in some examples, may include one or more local and/or remote storage devices accessible to the web server 202 for storing information regarding data uploaded to the storage server 204 via the client applications 216.

In return, the upload management application 218, in some implementations, may provide the client application 216c with location information regarding the upload of the file. For example, the upload management application 218 may provide a uniform resource locator (URL), uniform resource index (URI), internet protocol (IP) address, or other address for accessing the storage server 204. In some implementations, in addition to address information, the location information may include a storage region indicator, such as, in some examples, a disk name, disk identifier, or disk region identifier. In some implementations, authentication information may be provided to the client application 216c from the upload management application 218. The authentication information, for example, may be used to authenticate the client application 216c with a storage management application 220 executing upon the storage server 204. In some implementations, the upload management application 218 may provide the client application 216c with a unique identifier identifying the upload request. For example, the unique identifier may be later supplied from the storage management application 220 back to the upload management application 218, along with information regarding the data upload process. In a particular example, upon completion of an upload task, the storage management application 220 may report information to the upload management application 218 along with the unique identifier.

The upload management application 218, in some implementations, may use the unique identifier to locate an associated record in the metadata store 210. The upload management application 218, for example, may identify one or more records in the metadata store 210 based upon the unique identifier, and append information received from the storage management application 220 in relation to the unique identifier to the one or more records.

Upon receipt of the location information from the upload management application 218, in some implementations, the client application 216c may communicate with the storage management application 220 to transfer the data. For example, the client application 216c may provide the storage management application 220 with location information and/or authentication information. In some implementations, the storage management application 220 may use the information provided by the client application 216c to determine a position or region within a data store 214 for storage of the data. For example, the storage management application 220 may determine (e.g., based upon client information or a location identifier) that a particular disk or set of disks is reserved for data from a particular entity associated with the information provided by the client application 216c.

In some implementations, the client application 216c may manage the division of a data file into a number of portions or subsections. For example, the client application 216c may manage the division of the data file into N chunks, then monitor the transfer of a first M chunks of the N total chunks transmitted in parallel to the storage server 204. For example, the client application 216c may divide a data file into eight chunks, or portions.

The client application 216c may initiate transfer of the first M (e.g., four, six, eight, etc.) portions of the data file to upload in parallel to the storage server 204. The transfer of the first M portions, in some implementations, may be achieved through initiating a separate execution thread associated with each portion. In other implementations, each of the first M portions may be transmitted using a separate spawned process.

In some implementations, the client application 216c may initiate transfer of each of the first group of data chunks substantially simultaneously. In other implementations, one or more chunks of the first group of data chunks may be delayed in transfer. In a particular example, the client application 216c may initiate transfer of a first chunk, initiate transfer of a second chunk three seconds later, then initiate transfer of a third chunk three seconds after initiating transfer of the second chunk.

While the first M chunks of the N total chunks are being transmitted, the client application 216c, in some implementations, may monitor the transfer to verify that the chunks will be received in order at the storage server 204. For example, if a threshold portion of the second chunk of the data file is transmitted to the storage server 204 prior to completion of transmission of the entirety of the first chunk of the data file, the client application 216c may suspend the upload of the remaining portion of the second chunk of the data file pending completion of upload of the first chunk of the data file.

In some implementations, while portions of the data file are being transmitted to the storage server 204, the storage management application 220 may issue acknowledgement or verification messages to one or both of the client application 216c and the upload management application 218. For example, upon receipt of the first chunk, the storage management application 220 may issue an acknowledgment message confirming receipt and temporary storage of the first chunk.

In some implementations, upon receipt of a complete portion (e.g., chunk) of data, the storage management application 220 may encrypt and store the portion of data. In some implementations, the client application 216 may manage in-order receipt at the storage server 204 to enable on-the-fly encryption of the data while it is being transmitted. The storage management application 220, in some implementations, may apply a symmetric, or stateful, encryption technique. Without receiving the data in-order from the client device 208c, the storage management application 220 may have to track a state of a key as applied to each out-of-order data chunk.

The storage management application 220, in some implementations, may temporarily write incoming data to a cache 212. For example, data may initially be written to the cache 212 due to the cache 212 containing faster access memory, or due to the data store 214 containing a memory type that is not as easily or frequently re-writable as the memory type provided by the cache 212. In other implementations, the storage management application 220 may write the incoming data directly to the data store 214.

In some implementations, the storage management application 220 may transfer data stored in the cache 212 to the data store 214. For example, at some point after receiving the complete data from the client application 216c (e.g., a complete file), the storage management application 220 may copy the received data from the cache 212 to the data store 214. In this manner, for example, the storage management application 220 may avoid writing incomplete data to the data store 214, in the event that the data transfer between the client application 216c and the storage server 204 fails at some point in the process.

In some implementations, the data store 214 may be managed by a separate entity than the storage management application 220. For example, the storage management application 220 may be a utility configured to manage data upload between the web server 202 and a third party Cloud storage service. The Cloud storage service, for example, may host the storage management application 220 provided by the first entity (e.g., an entity controlling the web server 202 and providing the client applications 216) on the storage server 204 which is controlled by the third party Cloud storage service. The first entity, for example, may be a data organization and sharing service.

Upon completion of transfer of the data between the client device 208c and the storage server 204, in some implementations, the storage management application may provide information to the web server 202 regarding the receipt and storage of the data. For example, the storage management application 220 may provide an access code, address, or other information useful in later obtaining the stored data to the upload management application 218. The upload management application 218, in some implementations, may store a portion of the information received from the storage server 204, for example in the metadata store 210. In some implementations, the upload management application 218 may issue an acknowledgement to the storage management application 220 in response to the information provided.

Upon receiving acknowledgement of the completion of transfer from the storage management application 220, in some implementations, the upload management application 218 may redirect the client application 216c, if browser-based, to a completion screen provided by the web server 202.

Figure 3:
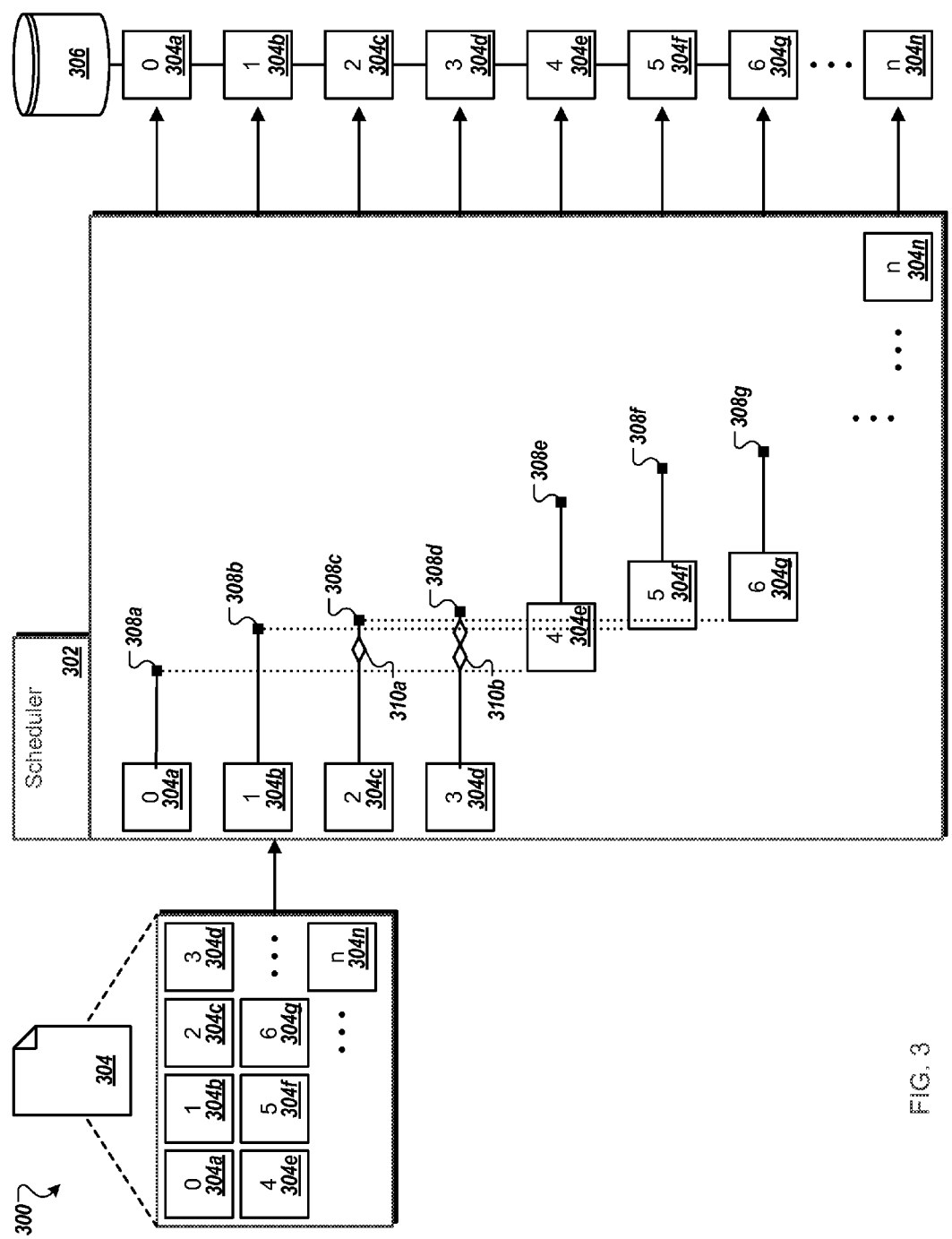
FIG. 3 is a flow diagram illustrating an example process for uploading a data file using multi-threaded optimization.

Turning to FIG. 3, a flow diagram 300 illustrates an example process that may be used, in some implementations, by a scheduler 302 to upload a data file 304 to a storage medium 306 using multi-threaded optimization. The scheduler 302, in some implementations, may be configured as part of a client-side file upload management application, such as the client applications 216 described in relation to FIG. 2.

A illustrated, the file 304 has been divided into chunk 0 304a through chunk n 304n. In some implementations, each of the chunks 0 through n−1 may be equal in size, while chunk n may include the remaining data of the file. Each chunk 304a through 304n−1, in some examples, may be approximately 500 kilobytes, 1 megabyte, 2 megabytes, 4 megabytes, or 8 megabytes in size. In a particular example, the file 304 may be divided into 4 megabyte chunks. In some implementations, the actual size of each of the chunks 304a through 304n−1 may be determined, in part, upon a bandwidth availability between a client computing device uploading the file 304 and a remote computing device providing access to the storage medium 306. The actual size of each of the chunks 304a through 304n-1, in some implementations, may be determined in part upon an available memory of the client computing device initiating the file transfer. The chunks 304a through 304n, in some implementations, may be prepared for transfer over Hypertext Transfer Protocol Secure (HTTPS). The chunks, in some implementations, may be transmitted using single sign-on (SSO) or secure socket layer (SSL) encryption.

The scheduler 302, in some implementations, may initiate upload of chunk 0 304a, chunk 1 304b, chunk 2 304c, and chunk 3 304d. In some implementations, the number of chunks transmitted in parallel may be determined, in part, by available memory on the computing device initiating the file transfer. In some implementations, the number of chunks transmitted in parallel may be determined in part upon the size of each chunk. The number of chunks transmitted in parallel may be adjusted, in some implementations, at a later point during file upload. For example, if it is determined that chunks are uploading at a threshold speed, the scheduler 302 may add one or more chunks to the parallel upload. In other implementations, the number of chunks uploading in parallel may remain fixed.

Upon completion 308a of upload of chunk 0 304a, in some implementations, the scheduler 302 may initiate upload of chunk 4 304e. In this manner, for example, four chunks may continually be uploading in parallel.

As illustrated at a threshold point 310a, the scheduler 302 may, in some implementations, suspend transmission of chunk 2 304c until completion 308b of the upload of chunk 1 304b to the storage medium 306. By suspending the upload of chunk 2 304c, for example, the scheduler 302 may maintain the order of upload of the chunks 304a through 304n to the storage medium 306. In some implementations, the scheduler 302 may suspend transmission of the data contained within chunk 2 304c once a threshold percentage of the data has transferred to the remote computing device. For example, the scheduler 302 may suspend transmission when five percent, three percent, or one percent of the data remains to be transferred. In some implementations, rather than a threshold percentage, the scheduler may suspend transmission upon recognizing a threshold amount of data (e.g., number of bytes) remaining. In some examples, the scheduler 302 may suspend transmission when ten kilobytes, 5 kilobytes, or 1 kilobyte of data remains to be transferred to the remote computing device.

In addition to suspension of chunk 2 304c, as illustrated by the threshold point 310a, in some implementations, the scheduler 302 may suspend transmission of two or more chunks until a previous chunk has completed upload. As shown, transmission of both chunk 2 304c and chunk 3 304d may be suspended (e.g., as shown by a threshold point 310b) by the scheduler 302 until completion of upload of chunk 1 304b. Furthermore, transmission of chunk 3 304d may remain suspended until completion of upload of chunk 2 304c.

Upon completion 308b of upload of chunk 1 304b, in some implementations, the scheduler may begin transmission of chunk 5 304f. As illustrated, at any point in time, a group of four chunks (e.g., 304a through 304d, 304b through 304e, 304c through 304f, etc.) may be uploading in parallel until the point in time at which fewer than 4 chunks remain available for upload to the storage medium 306.

In some implementations, should transmission of a chunk fail, the scheduler 302 may begin re-transmission of the failed chunk. For example, if transmission of chunk 4 304e should fail, the scheduler 302 would begin transmission of chunk 4 304e again. Because the scheduler 302 monitors the upload process to provide the chunks 304a through 304n in order to the storage medium 306, in some implementations, transmission of chunks 304f through 304h may be suspended pending completion of upload of chunk 4 304e. For example, if one or more of chunks 304f through 304h reach the threshold level of transmission, the scheduler 302 may suspend transmission of the remaining bytes of those chunks pending completion of upload of chunk 4 304e to the storage medium 306.

At the storage medium 306, in some implementations, each of the chunks 304a through 304n may be encrypted, in order, upon receipt. For example, each of the chunks 304a through 304n may be encrypted using a symmetric or stateful encryption algorithm. In some implementations, the storage medium 306 may be a cache memory. Upon successful upload of the entire file 304, for example, the encrypted chunks 304a through 304n may be transferred to a long term storage area.

Figure 4:
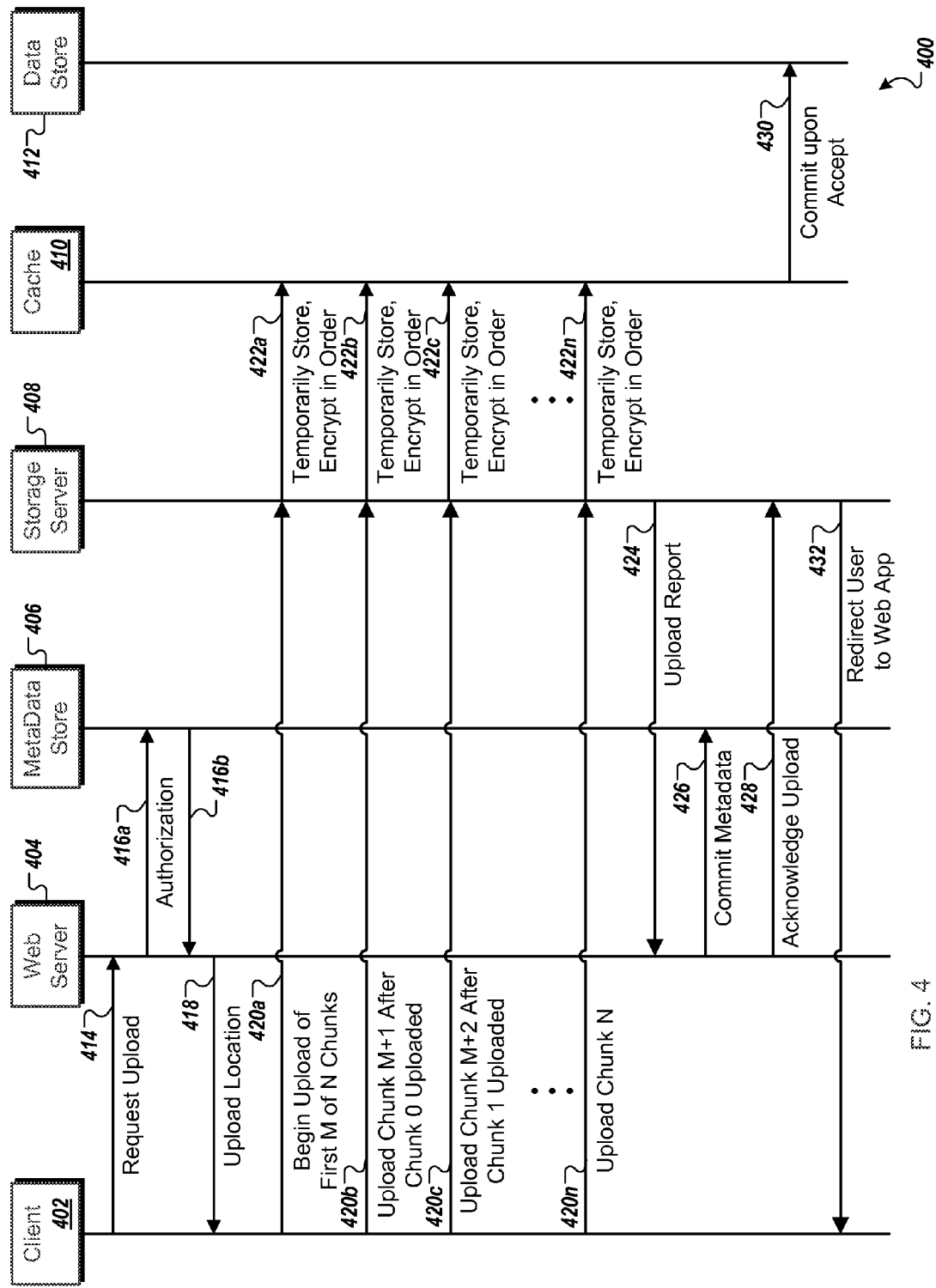
FIG. 4 is a swim lane diagram illustrating an example process for uploading a data file using multi-threaded optimization.

FIG. 4 is a swim lane diagram illustrating an example process 400 for uploading a data file using multi-threaded optimization. The process, in some implementations, may begin with a user accessing an application executing upon a client device 402, such as the client applications 216 described in relation to FIG. 2. The user, in some implementations, may submit an upload request 414 to a web server 404. The web server 404, for example, may be executing an upload management algorithm similar to the upload management application 218 described in relation to FIG. 2. The upload request 414, in some implementations, may include user authentication information, such as, in some examples, one or more of a user identifier, password, IP address of an authorized user device, and authentication token related to a client application initiating the request. In some implementations, the upload request 414 may include file information. In some examples, file information may include a file name, file type, file size, user permissions, security settings, and storage hierarchy (e.g., file and folder location) information.

The web server 404, in some implementations, may authenticate (416a, 416b) the request 414 through retrieval of information from a metadata store 406. For example, the web server 404 may authorize 416 the upload request 414 by verifying user authentication information provided by the client device 402. The web server 404, for example, may identify an upload account associated with the user. In some implementations, the web server 404 may determine a location for upload of the file, based in part upon the identified user. For example, location information related to the user authorization information may be stored in the metadata store 406.

The web server 404, in some implementations, may provide an upload location 418 to the client device 402. In some implementations, the upload location may be in the form of a URL, URI, IP address, or other address for accessing a storage server 408. In some implementations, in addition to address information, the location information may include a storage region indicator, such as, in some examples, a disk name, disk identifier, or disk region identifier. In some implementations, the web server 404 may provide the client device 402 with a unique identifier identifying the upload request.

The client device 402, in some implementations, may begin upload of the first M of N chunks 420a. In some implementations, the client device 402 may initiate transfer with the storage server 408 by providing the unique identifier identifying the upload request to the storage server 408. Additionally, the client device 402 may provide initial upload information pertaining to the data being provided by the client device 402 to the storage server 408 such as, in some examples, a file name, file size, total number of chunks, length of each chunk, and storage region indicator. In some implementations, the first M of N chunks may be transmitted 420*a* substantially simultaneously, in parallel, to the storage server 408. For example, each of the first M chunks may be allocated a separate thread or separate process for upload. The client device 402, in some implementations, may monitor the upload of each of the first M chunks such that the chunks arrive in order (e.g., complete upload in order) at the storage server 408.

Upon receipt of each chunk of the first M chunks, in some implementations, the storage server 408 may temporarily store the chunks 422*a* within a cache 410. For example, a storage management algorithm such as the storage management application 220 described in relation to FIG. 2, may execute upon the storage server 408 to manage storage of the chunks within the cache 410. In some implementations, the storage server 408 may apply an encryption technique to each chunk of the M chunks while writing the M chunks to the cache 410.

Once the first chunk (e.g., "chunk 0") of the first M chunks has successfully uploaded to the storage server 408, in some implementations, the client device 402 may initiate upload of the next chunk 420*b* (e.g., "chunk M+1") to the storage server 408. In some implementations, this process may continue, with up to M chunks being uploaded 420 by the client device 402 to the storage server 408 at a time, until the last chunk (e.g., "chunk N") of the file is uploaded 420*n* by the client device 402. Meanwhile, the storage server 408, in some implementations, may continue to receive, encrypt, and store 422 each chunk within the cache 410.

After receiving, encrypting, and storing the final chunk 422*n*, in some implementations, the storage server 408 may provide an upload report 424 to the web server 404. The upload report 424, in some implementations, may include the unique identifier identifying the upload request, for example as provided by the web server 404 to the client device 402 in relation to the upload request 414. In some examples, the upload report 424 may include an indication of success or failure, a total size of the file, a storage location of the file, an access identifier for accessing the stored file, and user information regarding the client device 402 or the user thereof (e.g., user name, client device IP address, etc.). In some implementations, the upload report may include details useful for statistical purposes in evaluating the functionality of the multi-threaded upload process. For example, the upload report may include data regarding the number of failed uploads of chunks and/or a timestamp related to the upload of each of the N chunks.

The web server 404, in some implementations, may commit a portion of the information received within the upload report 426 to the metadata store 406. For example, in relation to the upload request, the web server 404 may commit access information for later accessing the uploaded file.

In some implementations, the web server 404 may issue an upload acknowledgement 428 to the storage server 408. For example, the web server 404 may acknowledge receipt of the upload report 424.

In some implementations, during the upload process, the communication stream or browser display of the client device 402 may have been redirected from the web server 404 to the storage server 408. For example, if the upload location 418 provided to the client device 402 from the web server 404 contained a URL or URI, in some implementations, a browser-based upload tool functioning upon the client device 402 may have been redirected to receive information directly from the storage server 408. Thus, in some implementations, the storage server 408 may redirect the user interface 432 back to communication between the client device 402 and the web server 404.

At some point in time after complete upload of the file, in some implementations, the uploaded file may be committed 430 from the cache 410 to a data store 412. In some implementations, the storage management algorithm executing on the storage server 408 may commit the file from the cache 410 to the data store 412. In other implementations, a separate process or application on the storage server 408 or on a separate computing device may commit the file from the cache 410 to the data store 412. For example, if the storage management algorithm has been configured as an interface tool provided by a first entity to interface with the web server 404 during upload of files, and a second entity installed the storage management algorithm upon the storage server 408 to manage the upload of data on behalf of the first entity, the second entity may manage the long term storage of the file within the data store 412.

Figure 5:
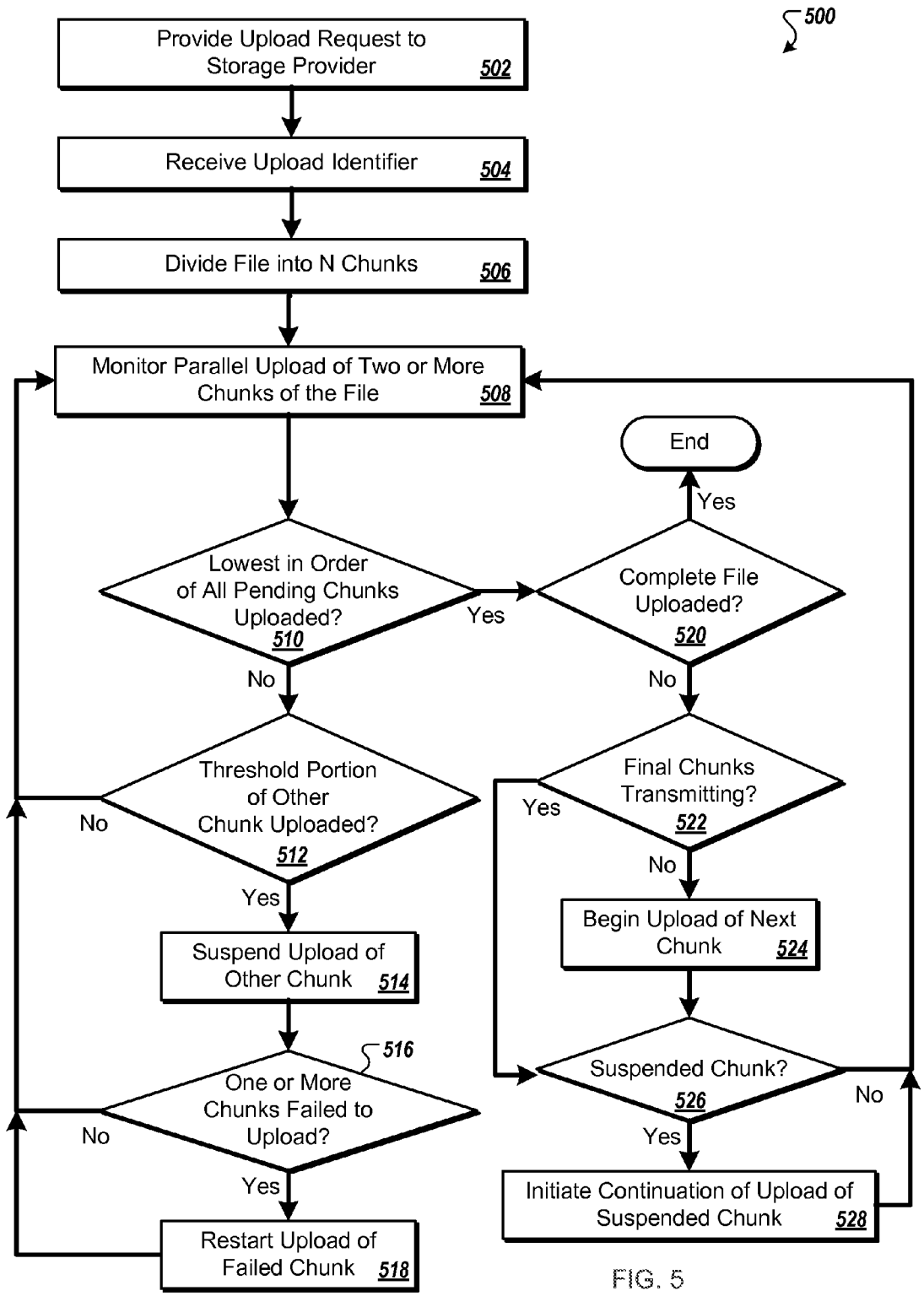
FIG. 5 is a flow chart illustrating an example method for uploading a data file using multi-threaded optimization.

FIG. 5 is a flow chart illustrating an example method 500 for uploading a data file using multi-threaded optimization. The method 500, for example, may be executed by the client application 216 described in relation to FIG. 2. The method 500, in some implementations, may begin with providing an upload request to a storage provider (502). The upload request, in some implementations, may include information regarding both the file and the requestor such as, in some examples, a file name, file type, file source location, file size, user name, and password.

In some implementations, an upload identifier may be received (504). The upload identifier, in some implementations, may include a destination address for transmitting the file for upload. For example, the upload identifier may include a URL, URI, or IP address of a network location for transmission of the file. In some implementations, the upload identifier may include an upload token (e.g., password, identification number, security code, etc.) to provide to a remote location to authenticate upload of the file to the storage provider.

In some implementations, the file may be divided into a number of chunks (506). In some implementations, each of the chunks may be equal in size, while the last chunk may be smaller than the others as the last chunk may include the remaining data of the file. Each chunk, in some examples, may be approximately 500 kilobytes, 1 megabyte, 2 megabytes, 4 megabytes, or 8 megabytes in size. In a particular example, the file may be divided into 4 megabyte chunks. In some implementations, the actual size of each of the chunks may be determined, in part, upon a bandwidth available between a client computing device transmitting the file and a remote computing device receiving the file. The actual size of each of the chunks, in some implementations, may be determined in part upon an available memory of the client computing device initiating the file transfer. In some implementations, the file may be divided into a set number of chunks based upon a size of the file. For example, for each megabyte of file, the file may be divided into two chunks.

In some implementations, the parallel upload of two or more of the N chunks of the file may be monitored (508). In some implementations, a monitoring process may monitor the progress of upload via individual thread operations executing in parallel. The monitoring process, in some implementations, may monitor the progress of upload via individual upload processes. In a particular example, the monitoring process may monitor individual threads for success, failure, or progress in comparison to a threshold portion of transmission of a chunk of a file (e.g., a threshold percentage of a chunk or a threshold number of bytes of a chunk, etc.). In some implementations, the monitoring process may ensure that complete chunks are received at the storage provider in-order.

If the lowest in order of all presently uploading chunks has not yet completed the upload process (510), but a threshold portion of another presently uploading chunk has been transmitted (512), in some implementations, the upload of the other uploading chunk may be suspended (514). In some implementations, to ensure in-order receipt of the chunks, if a particular chunk is nearing completion before an earlier (e.g., closer to the beginning of the file) chunk has completed, the transmission of the remainder of the chunk may be suspended until completion of upload of the earlier chunk. In some examples, the threshold may represent a percentage (e.g., 95%, 99%, etc.) of the chunk having been transmitted, or a threshold number of bytes (e.g., 500 bytes, 1 kilobyte, etc.) remaining to be transmitted.

If one or more chunks has failed to upload (516), in some implementations, upload of the failed chunk may be re-started (518). For example, if, during transmission of a chunk, a connection failure, memory allocation failure, or other failure occurs, transmission of that particular chunk may fail. If failure should occur, in some implementations, the failed chunk may be scheduled for immediate re-transmission.

If the lowest in order of all presently uploading chunks has completed the upload process (510), but additional chunks are pending upload (520), in some implementations, it may be determined whether a next chunk is available to begin transmission (522). If a next chunk is available to begin transmission, in some implementations, the upload of the next chunk may be initiated (524). In some implementations, chunks may be uploaded in parallel such at, at any point in time, as long as X chunks remain to be uploaded, X chunks will be in the process of transmission. For example, three chunks may be initially transmitted in parallel (e.g., chunk0, chunk1, and chunk2). Upon successful completion of upload of chunk0, in this example, a next chunk, chunk3, may begin transmission.

If a chunk was previously suspended (526), in some implementations, the continuation of upload of the suspended chunk may be initiated (528). For example, three chunks may be initially transmitted in parallel, chunk0, chunk1, and chunk2. If a threshold portion of chunk1 uploads prior to the completion of upload of chunk0, the transmission of chunk1 may be suspended. Upon successful completion of upload of chunk0, in this example, the remaining portion of chunk1 may be transmitted.

If, at some point in time, a chunk completes the uploading process (510), and it may be determined that all chunks of the file have been uploaded (520), the process 500 may end. In some implementations, an acknowledgement may be received from the storage provider. The acknowledgement of success of upload, for example, may be a trigger for ending the process 500.

Although described in a particular order, the steps of the method 500 may be accomplished in a different order while achieving a similar result. Additionally, more or fewer steps may be included in the method 500. For example, an acknowledgement of upload of a chunk may, in some implementations, be received prior to beginning upload of a next chunk 524.

Figure 6:
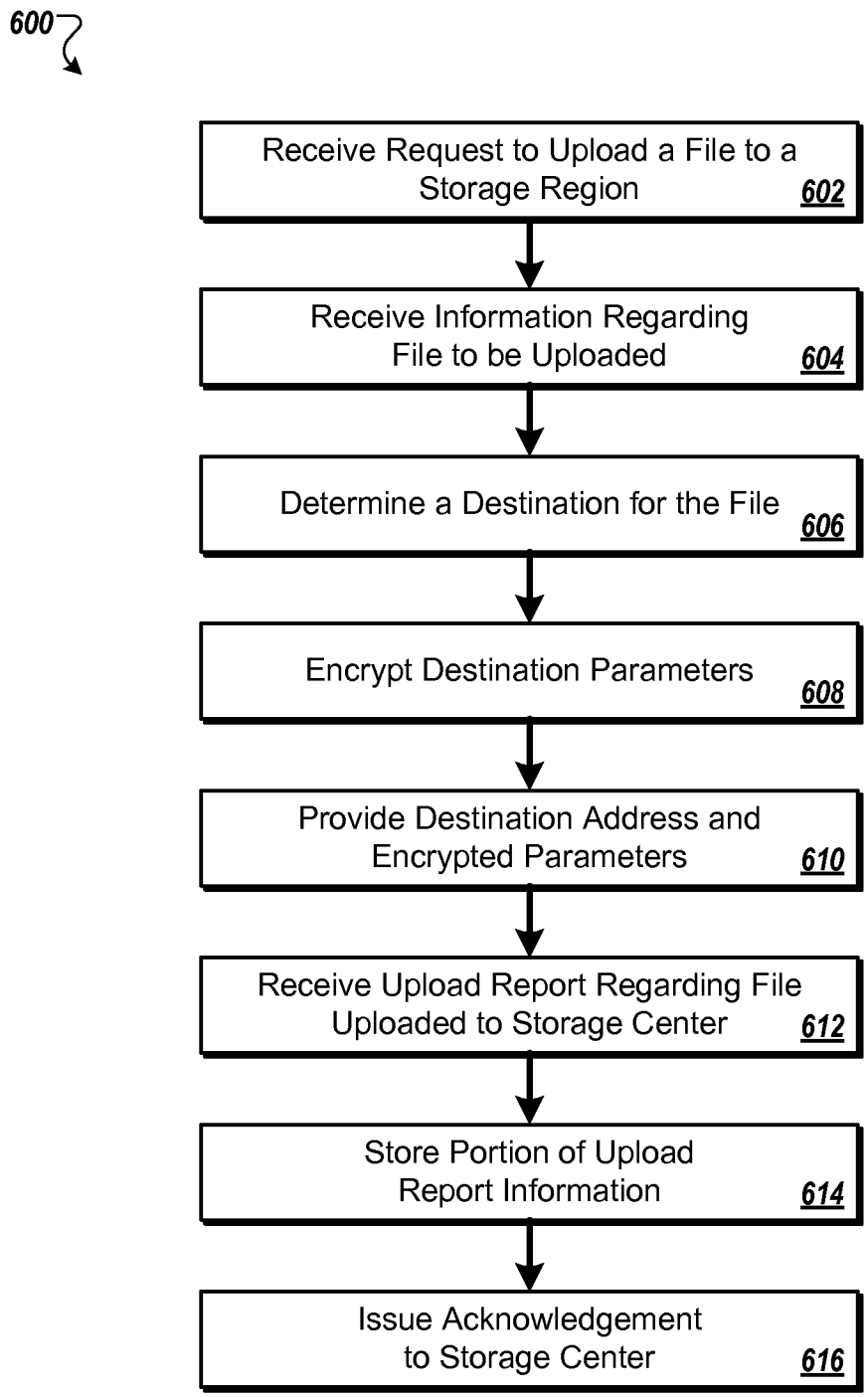
FIG. 6 is a flow chart illustrating an example method for coordinating the upload of a data file using multi-threaded optimization.

FIG. 6 is a flow chart illustrating an example method 600 for coordinating the upload of a data file using multi-threaded optimization. The method 600, for example, may be executed by the upload management application 218 described in relation to FIG. 2. The method 600, in some implementations, may begin with receiving a request to upload a file to a storage region (602). The request, in some implementations, may be issued by a client device in relation to uploading a file from the client device to a storage center. In some implementations, the request may be communicated through a browser-based interface provided by an application executing the process 600.

In some implementations, information regarding the file to be uploaded may be received (604). The requestor, in some implementations, may provide information about the file to be uploaded in the form of meta data. In some examples, the information may include a file name, file source location, file size, file type, and file security settings. In some implementations, the information may include information regarding a user requesting upload of the file. In some examples, user information may include a user name, password, security credentials, IP address, and group or entity information.

In some implementations, a destination address for the file may be determined (606). In some implementations, the destination address may be based in part upon the meta data. The destination address, in some implementations, may include a URL, URI, IP address, or other address for accessing the storage center. In some implementations, in addition to address information, additional destination information may include a storage region indicator, such as, in some examples, a disk name, disk identifier, or disk region identifier.

In some implementations, destination parameters may be encrypted (608). The destination parameters, in some implementations, may be encrypted in a manner known to the storage center. For example, the destination parameters may be encrypted such that they are not readable by the requestor or another party, but may remain secure until receipt at the storage center. In some implementations, the destination parameters may include a portion of the additional destination information. The destination parameters, in some implementations, may include authentication information for allowing storage of an uploaded file.

In some implementations, the destination address and encrypted destination parameters may be provided to the requestor (610). In some implementations, the destination address and encrypted destination parameters may be provided by an application executing upon a computing device of the requestor. In some implementations, a browser-based application may be executing upon the computing device, and the browser may be redirected to the destination address. Once the requestor has received the destination address and the encrypted destination parameters, in some implementations, the requestor may proceed to upload the file to the storage center.

In some implementations, an upload report regarding file upload to a storage center may be received (612). At some point after the requestor has uploaded (or attempted to upload) a file to the storage center, the storage center may, in some implementations, provide an upload report regarding the file upload process. In some implementations, the upload report may include a portion of the encrypted destination parameters. In some examples, the upload report may include an indication of success or failure, a total size of the file, a storage location of the file, an access identifier for accessing the stored file, and user information regarding the requestor. In some implementations, the upload report may include details useful for statistical purposes in evaluating the functionality of a multi-threaded upload process used by the requestor. For example, the upload report may include data regarding the number of failed uploads of chunks and/or a timestamp related to the upload of each of the N chunks. In some implementations, the upload report may be encrypted. For example, the upload report may be encrypted using a similar encryption technique to the encryption technique applied to the destination parameters.

In some implementations, a portion of the upload report information may be stored (614). To manage subsequent access to the uploaded file, for example, information such as access information may be stored for later retrieval. In some implementations, the information may be committed to a database.

In some implementations, an acknowledgement may be issued to the storage center (616). For example, an acknowledgement regarding successful receipt of the upload report may be provided to the storage center.

Although described in a particular order, the steps of the method 600 may be accomplished in a different order while achieving a similar result. Additionally, more or fewer steps may be included in the method 600. For example, an acknowledgement, in some implementations, may not be issued to the storage center in relation to receipt of the upload report. In another example, in some implementations, the acknowledgement may be issued to the storage center (616) prior to storing the portion of the upload report (614).

Figure 7:
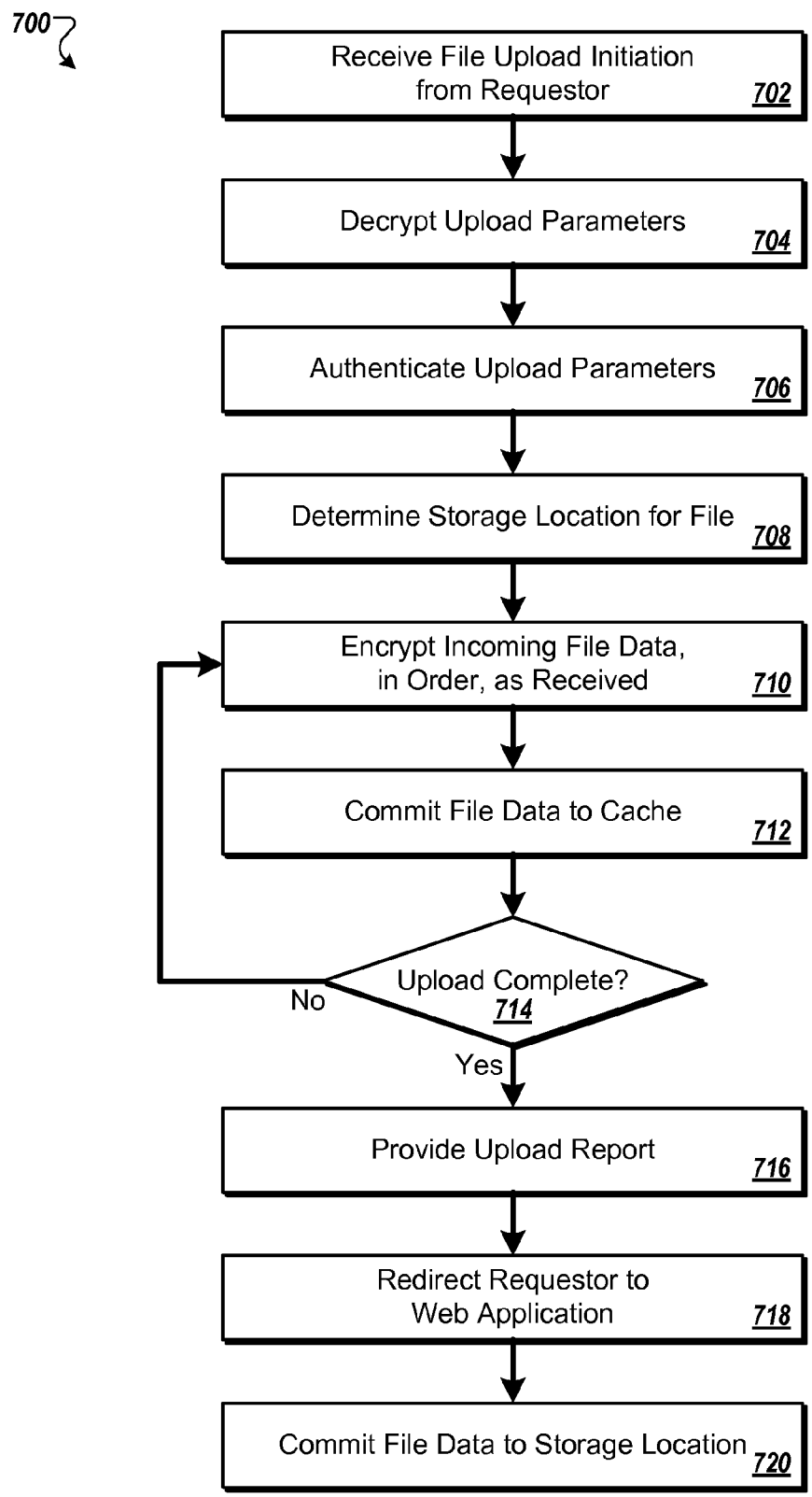
FIG. 7 is a flow chart illustrating an example method for receiving portions of a data file through multi-threaded optimization.

FIG. 7 is a flow chart illustrating an example method 700 for receiving portions of a data file through multi-threaded optimization. The method 700, for example, may be executed by the storage management application 220 described in relation to FIG. 2. The method 700, in some implementations, may begin with receiving a file upload initiation from a requestor (702). The requestor, in some implementations, may provide encrypted upload parameters for uploading a file to a storage center.

In some implementations, upload parameters may be decrypted (704). The upload parameters, in some implementations, may have been encrypted by an upload management application in communication with the requestor. For example, the requestor may provide the encrypted upload parameters without having access to the contents due to the encryption applied by the upload management application.

In some implementations, upload parameters may be authenticated (706). The upload parameters, in some implementations, may include authentication information identifying the upload management application. In some implementations, the upload parameters may identify the requestor as an authenticated user authorized to upload files to the storage center.

In some implementations, a storage location for the file may be determined (708). In some implementations, the storage location may be included within the upload parameters. The storage location, in some implementations, may be derived through information located in the upload parameters. For example, based upon user information, entity or organization information, a file type, a file size, or other details regarding the requestor and/or the file, a storage location may be determined. In some implementations, a request for a location may be submitted to a storage center service. For example, the process 700 may be executing within the storage center on behalf of another entity, and the process 700 may communicate with the storage center to obtain permissions and instructions regarding storage of files.

While data is received (714), in some implementations, incoming file data may be encrypted in the order in which it is received (710). In some implementations, the file may be uploaded in a number of chunks, where a first group of chunks may be uploaded in parallel. Upon completion of upload of a particular chunk, the data may be encrypted. In some implementations, the requestor may monitor the upload of the chunks such that, although two or more chunks may be transmitting in parallel, upload of a prior chunk always completes prior to upload of a latter chunk of the file. In this manner, for example, a symmetric or stateful encryption technique may be applied to the chunks without having to track a state of encryption for each chunk in relation to other (e.g., out-of-order) chunks of the file.

The encrypted file data, in some implementations, may be committed to cache memory (712). In some implementations, the chunks may be initially committed to a temporary location in cache memory storage, for example until the complete file has been received.

Upon completion of file upload (714), in some implementations, an upload report may be provided (716). The upload report, in some implementations, may be provided to the originator of the encrypted upload parameters. For example, an upload management application, such as the upload management application 218 described in relation to FIG. 2, may encrypt the upload parameters and provide them to the requestor prior to the requestor providing the encrypted upload parameters to the method 700.

In some implementations, the upload report may include a portion of the encrypted destination parameters. In some examples, the upload report may include an indication of success or failure, a total size of the file, a storage location of the file, an access identifier for accessing the stored file, and user information regarding the requestor. In some implementations, the upload report may include details useful for statistical purposes in evaluating the functionality of a multi-threaded upload process used by the requestor. For example, the upload report may include data regarding the number of failed uploads of chunks and/or a timestamp related to the upload of each of the N chunks. In some implementations, the upload report may be encrypted. For example, the upload report may be encrypted using a similar encryption technique to the encryption technique applied to the upload parameters.

In some implementations, the requestor may be redirected to a web application (718). In some implementations, if the requestor submitted the request through a browser-based upload tool directed to a URL or URI associated with the file upload destination, the requestor may be redirected such that the browser user interface communicates with a web application. The web application, for example, may be associated with the originator of the encrypted upload parameters.

In some implementations, the uploaded file may be committed to a long term storage location (720). For example, upon recognition of receipt and encryption of the entire file, the file may be moved from the cache to a storage region for long term storage.

Although described in a particular order, the steps of the method 700 may be accomplished in a different order while achieving a similar result. Additionally, more or fewer steps may be included in the method 700. For example, rather than first committing file data to cache (712) and later committing the file data to a long term storage location (720), in some implementations, the file data may be immediately committed to the long term storage area. In another example, in some implementations, a separate process or application may commit the file (720) from the cache to the long term storage location. For example, if the process 700 has been configured as part of an interface tool provided by a first entity to interface with a web application during upload of files, and a second entity installed the process 700 on a computing device accessible to the cache memory to manage the upload of data on behalf of the first entity, the second entity may manage the long term storage of the file.

In view of the structure, functions and apparatus of the systems and methods described here, in some implementations, a system and method for multi-threaded optimization of file uploading are provided. Having described certain implementations of methods and apparatus for supporting multi-threaded optimization of file uploading, it will now become apparent to one of skill in the art that other implementations incorporating the concepts of the disclosure may be used. Therefore, the disclosure should not be limited to certain implementations, but rather should be limited only by the spirit and scope of the following claims.

What is claimed:

1. A method comprising:
   receiving, at a first computing device, a command, from a second computing device, to upload a file to a storage region;
   negotiating, with a third computing device, a destination for the file, wherein the destination correlates to a storage location at the storage region;
   monitoring, by a processor of the first computing device, upload of a plurality of chunks of the file to ensure in-order receipt of the plurality of chunks by the destination, wherein ensuring in-order receipt of the plurality of chunks comprises:
      determining, by the processor, that a threshold portion of a second chunk of the plurality of chunks has been transmitted to the destination prior to upload of an entirety of a first chunk of the plurality of chunks, wherein
         the first chunk comprises a beginning portion of the file,
         the second chunk comprises a portion of the file logically contiguous with the beginning portion of the file, and
         at least a portion of the first chunk is transmitted to the destination in parallel with at least a portion of the second chunk,
      responsive to determining that the threshold portion of the second chunk has been transmitted, initiating suspension of upload of the second chunk,
      determining upload of the entirety of the first chunk has completed, and
      responsive to determining upload of the entirety of the first chunk has completed,
         (a) initiating continuation of upload of the second chunk, and
         (b) reporting success of upload of the first chunk to the second computing device.

2. The method of claim 1, further comprising, responsive to determining upload of the entirety of the first chunk has completed, initiating upload of a third chunk of the file, wherein the third chunk is logically contiguous with the second chunk.

3. The method of claim 2, wherein initiating upload of the third chunk comprises issuing an upload command to the second computing device.

4. The method of claim 1, wherein the threshold portion comprises a threshold number of bytes of data.

5. The method of claim 1, further comprising:
   monitoring, by the processor of the first computing device, upload of a third chunk of the file and a fourth chunk of the file, wherein:
      the third chunk is logically contiguous with the second chunk,
      the fourth chunk is logically contiguous with the third chunk, and
      at least a portion of the third chunk and at least a portion of the fourth chunk are transmitted in parallel with at least a portion of the first chunk and at least a portion of the second chunk.

6. The method of claim 5, further comprising:
   determining, by the processor, that a threshold portion of the third chunk has been transmitted prior to upload of the entirety of the first chunk; and
   responsive to determining that a threshold portion of the third chunk has been transmitted prior to upload of the entirety of the first chunk,
      initiating suspension of upload of the third chunk,
      determining upload of the entirety of the second chunk has completed, and
      responsive to determining both upload of the entirety of the first chunk has completed and upload of the entirety of the second chunk has completed, initiating continuation of upload of the third chunk.

7. The method of claim 6, wherein the threshold portion of the third chunk is equal to the threshold portion of the second chunk.

8. The method of claim 1, further comprising:
   determining, at the processor, a failure of upload of the first chunk;
   responsive to determining the failure of upload of the first chunk,
      initiating suspension of upload of the second chunk, and
      initiating re-upload of the first chunk.

9. A system comprising:
   a processor; and
   a memory storing instructions thereon, wherein the instructions when executed cause the processor to:
      receive, at a first computing device, a command, from a second computing device, to upload a file to a storage region;
      negotiate, with a third computing device, a destination for the file, wherein the destination correlates to a storage location at the storage region;
      monitor upload of a plurality of chunks of the file to ensure in-order receipt of the plurality of chunks by the destination, wherein ensuring in-order receipt of the plurality of chunks comprises;
         determining that a threshold portion of a second chunk of the plurality of chunks has been transmitted to the destination prior to upload of an entirety of a first chunk of the plurality of chunks, wherein
            the first chunk comprises a beginning portion of the file,
            the second chunk comprises a portion of the file logically contiguous with the beginning portion of the file, and
            at least a portion of the first chunk is transmitted to the destination in parallel with at least a portion of the second chunk,
         after determining that the threshold portion of the second chunk has been transmitted, initiating suspension of upload of the second chunk,
         determining upload of the entirety of the first chunk has completed, and
         after determining upload of the entirety of the first chunk has completed,
            (a) initiating continuation of upload of the second chunk, and
            (b) reporting success of upload of the first chunk to the second computing device.

10. The system of claim 9, wherein the system receives the command from the second computing device through a virtual machine application interface.

11. The system of claim 9, wherein the first computing device is in communication with a plurality of networked storage devices.

12. The system of claim 9, wherein the system comprises a Web server configured to communicate with the second computing device through a browser-based file sharing service.

13. The system of claim 9, wherein the file is uploaded using Hypertext Transfer Protocol Secure.

14. The system of claim 9, wherein the instructions when executed further cause the processor to:
   responsive to completion of upload of the file, create a data base entry regarding the file, wherein the data base entry comprises an address for accessing the file through the first computing device.

15. A non-transient computer readable medium having instructions stored thereon that, when executed, cause a processor to:
   receive, at a first computing device, a request, from a second computing device, to upload a file;
   monitor upload of a plurality of chunks of the file to ensure in-order receipt of the plurality of chunks by a third computing device, wherein ensuring in-order receipt of the plurality of chunks comprises:
      determining that a threshold portion of a second chunk of the plurality of chunks has been transmitted to the third computing device prior to upload of an entirety of a first chunk of the plurality of chunks, wherein
         the first chunk comprises a beginning portion of the file,
         the second chunk comprises a portion of the file logically contiguous with the beginning portion of the file, and
         at least a portion of the first chunk is transmitted to the destination in parallel with at least a portion of the second chunk,
      responsive to determining that a threshold portion of the second chunk has been transmitted prior to upload of an entirety of the first chunk, initiating suspension of upload of the second chunk;
      determine determining receipt of the entirety of the first chunk by the third computing device, and
      responsive to determining receipt of the entirety of the first chunk,
         continuing upload of the second chunk, and
         initiating upload of a third chunk of the plurality of chunks, wherein the third chunk is logically contiguous with the second chunk.

16. The computer readable medium of claim 15, wherein the third computing device comprises a storage server in communication with a plurality of networked storage devices.

17. The computer readable medium of claim 16, wherein the instructions, when executed, further cause the processor to negotiate, with the storage server, a destination for the file, wherein the destination correlates to a storage location on at least one of the plurality of networked storage devices.

18. The computer readable medium of claim 15, wherein the instructions, when executed, further cause the processor to, responsive to determining receipt of the entirety of the first chunk, report success of upload of the first chunk to the second computing device.

19. The computer readable medium of claim 15, wherein the instructions, when executed, further cause the processor to, responsive to completion of upload of an entirety of the file, store an address, wherein the address provides access to the file.

20. The computer readable medium of claim 15, further comprising, prior to monitoring upload of the plurality of chunks:
   initiating a first execution thread for transmission of the first chunk; and
   initiating a second execution thread for transmission of the second chunk, wherein monitoring the upload of the plurality of chunks comprises monitoring the first execution thread and the second execution thread.

* * * * *

UNITED STATES PATENT AND TRADEMARK OFFICE
CERTIFICATE OF CORRECTION

PATENT NO. : 8,473,585 B1
APPLICATION NO. : 13/533507
DATED : June 25, 2013
INVENTOR(S) : Joshua E. Smith et al.

Page 1 of 1

It is certified that error appears in the above-identified patent and that said Letters Patent is hereby corrected as shown below:

In the claims at column 28, claim number 15, line number 3, delete the word "determine"

Signed and Sealed this
Sixth Day of August, 2013

Teresa Stanek Rea
*Acting Director of the United States Patent and Trademark Office*